(12) United States Patent
Derhammer et al.

(10) Patent No.: US 10,895,311 B2
(45) Date of Patent: Jan. 19, 2021

(54) FOUR-PASS TORQUE CONVERTER WITH VARIABLE-PITCH STATOR AND BYPASS CLUTCH

(71) Applicant: SCHAEFFLER TECHNOLOGIES AG & CO. KG, Herzogenaurach (DE)

(72) Inventors: Andrew Derhammer, Wadsworth, OH (US); Jeremy Vanni, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 262 days.

(21) Appl. No.: 15/979,976

(22) Filed: May 15, 2018

(65) Prior Publication Data
US 2019/0353235 A1 Nov. 21, 2019

(51) Int. Cl.
| F16H 45/02 | (2006.01) |
| F16H 41/24 | (2006.01) |
| F01D 17/16 | (2006.01) |
| F16D 25/0635 | (2006.01) |
| F01D 9/04 | (2006.01) |
| F16D 13/46 | (2006.01) |

(52) U.S. Cl.
CPC ............ *F16H 45/02* (2013.01); *F01D 9/041* (2013.01); *F01D 17/162* (2013.01); *F16D 13/46* (2013.01); *F16D 25/0635* (2013.01); *F16H 41/24* (2013.01)

(58) Field of Classification Search
None
See application file for complete search history.

(56) References Cited

U.S. PATENT DOCUMENTS

| 2,909,034 A | 10/1959 | Jandasek |
| 2,924,941 A | 2/1960 | Snoy |
| 2,944,402 A | 7/1960 | Russell |
| 2,944,441 A | 7/1960 | Russell |
| 2,999,400 A | 9/1961 | Kelley |
| 3,852,955 A | 12/1974 | Wonn et al. |
| 3,934,414 A | 1/1976 | Merkle et al. |
| 3,986,356 A | 10/1976 | Frötschner et al. |
| 4,009,571 A | 3/1977 | Black et al. |
| 4,108,290 A | 8/1978 | Fisher |
| 4,128,999 A | 12/1978 | Yokoyama et al. |
| 4,180,977 A | 1/1980 | Beardmore |
| 4,377,068 A | 3/1983 | Braatz |
| 4,848,084 A | 7/1989 | Wirtz |
| 5,263,319 A | 11/1993 | By et al. |
| 5,307,629 A | 5/1994 | By et al. |
| 9,784,353 B2 | 10/2017 | Frait et al. |
| 2009/0071787 A1* | 3/2009 | Hemphill ............ F16D 25/0635 192/3.29 |
| 2011/0132709 A1 | 6/2011 | Fukunaga et al. |

(Continued)

FOREIGN PATENT DOCUMENTS

JP 63062965 A 3/1988

*Primary Examiner* — Charles A Fox
*Assistant Examiner* — Ryan P Dodd
(74) *Attorney, Agent, or Firm* — Brooks Kushman P.C.

(57) ABSTRACT

A torque converter includes a turbine disposed in a hydrodynamic chamber. A bypass clutch has an apply chamber fluidly isolated from the hydrodynamic chamber. A first hydraulic passage is in fluid communication with the apply chamber. A variable-pitch stator including blades controllable by an actuator that has a chamber in fluid communication with the first hydraulic passage.

20 Claims, 2 Drawing Sheets

(56) References Cited

U.S. PATENT DOCUMENTS

| | | |
|---|---|---|
| 2015/0362052 A1* | 12/2015 | Frait ................. F16H 61/14 60/341 |
| 2016/0047469 A1 | 2/2016 | LaVoie et al. |
| 2016/0116044 A1* | 4/2016 | Frait ................. F16H 45/02 192/3.29 |
| 2016/0159363 A1* | 6/2016 | Brevick ............ F16H 61/143 701/51 |
| 2017/0130812 A1* | 5/2017 | Maurer .............. F16H 45/02 |
| 2017/0276244 A1 | 9/2017 | Stützinger et al. |

* cited by examiner

FOUR-PASS TORQUE CONVERTER WITH VARIABLE-PITCH STATOR AND BYPASS CLUTCH

TECHNICAL FIELD

The present disclosure relates to torque converters and more particularly to torque converters having a variable-pitch stator and a bypass clutch that share a hydraulic passage.

BACKGROUND

Automatic transmissions may include a torque converter for coupling a transmission input shaft to a crankshaft of an engine. The torque converter may include an impeller fixed to the crankshaft, a turbine fixed to the input shaft, and a stator disposed between the impeller and the turbine. The torque converter may also include a bypass clutch to mechanically couple the transmission input shaft to the case of the torque converter, which is fixed to the crankshaft. The bypass clutch may include one or more clutch plates that rotate with the case and are interleaved with one or more disks that rotate with the input shaft. To engage the clutch, pressurized fluid forces a piston to compress the plates and disks.

The stator redirects fluid returning from the turbine so that the fluid is rotating in the same direction as the impeller. Some stators have variable-pitch blades that are controllable to alter the flow of fluid from the turbine to the impeller to tighten or loosen the torque converter.

SUMMARY

According to one embodiment, a torque converter includes a turbine disposed in a hydrodynamic chamber. A bypass clutch has an apply chamber fluidly isolated from the hydrodynamic chamber. A first hydraulic passage is in fluid communication with the apply chamber. A variable-pitch stator including blades controllable by an actuator that has a chamber in fluid communication with the first hydraulic passage.

According to another embodiment, a torque converter includes a turbine disposed in a hydrodynamic chamber. A bypass clutch of the torque converter has an apply chamber fluidly isolated from the hydrodynamic chamber. A first hydraulic passage is in fluid communication with the apply chamber. A variable-pitch stator includes blades controllable by an actuator that has a tightening chamber in fluid communication with the first hydraulic passage. The actuator is configured to tighten the blades in response to a first pressure being applied to the first hydraulic passage, and the bypass clutch is configured to be engaged in response to a second, larger pressure being applied to the first hydraulic passage.

According to yet another embodiment, a torque converter includes an impeller, a turbine disposed in a hydrodynamic chamber, and a clutch selectively engageable to couple the impeller to the turbine. The clutch includes a piston, an apply chamber fluidly isolated from the hydrodynamic chamber, a compensation chamber, and a first resilient member disposed in the compensation chamber and biasing the piston toward the apply chamber. A first hydraulic passage is in fluid communication with the apply chamber and is configured to receive fluid from a valve body. A second hydraulic passage is in fluid communication with the compensation chamber and is configured to convey fluid between the compensation chamber and a transmission lubrication or low-pressure circuit. A variable-pitch stator includes blades controllable by an actuator that has a tightening chamber in fluid communication with the first hydraulic passage and an isolation chamber in fluid communication with the second hydraulic passage. The actuator is configured to adjust a pitch of the blades in response to a first pressure being present in the first hydraulic passage, and the piston is configured to be stroked to engage the clutch in response to a second, larger pressure being present in the first hydraulic passage.

According to another embodiment, a method of operating a torque converter is presented. The torque converter may include a bypass clutch having an apply chamber fluidly isolated from a hydrodynamic chamber of the torque converter. The torque converter may further include a variable-pitch stator having blades controllable by an actuator that has a tightening chamber. A first hydraulic passage is in fluid communication with the apply chamber and the tightening chamber. The method includes tightening the blades in response to a first pressure being applied to the first hydraulic passage, and engaging the clutch in response to a second, larger pressure being applied to the first hydraulic passage.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
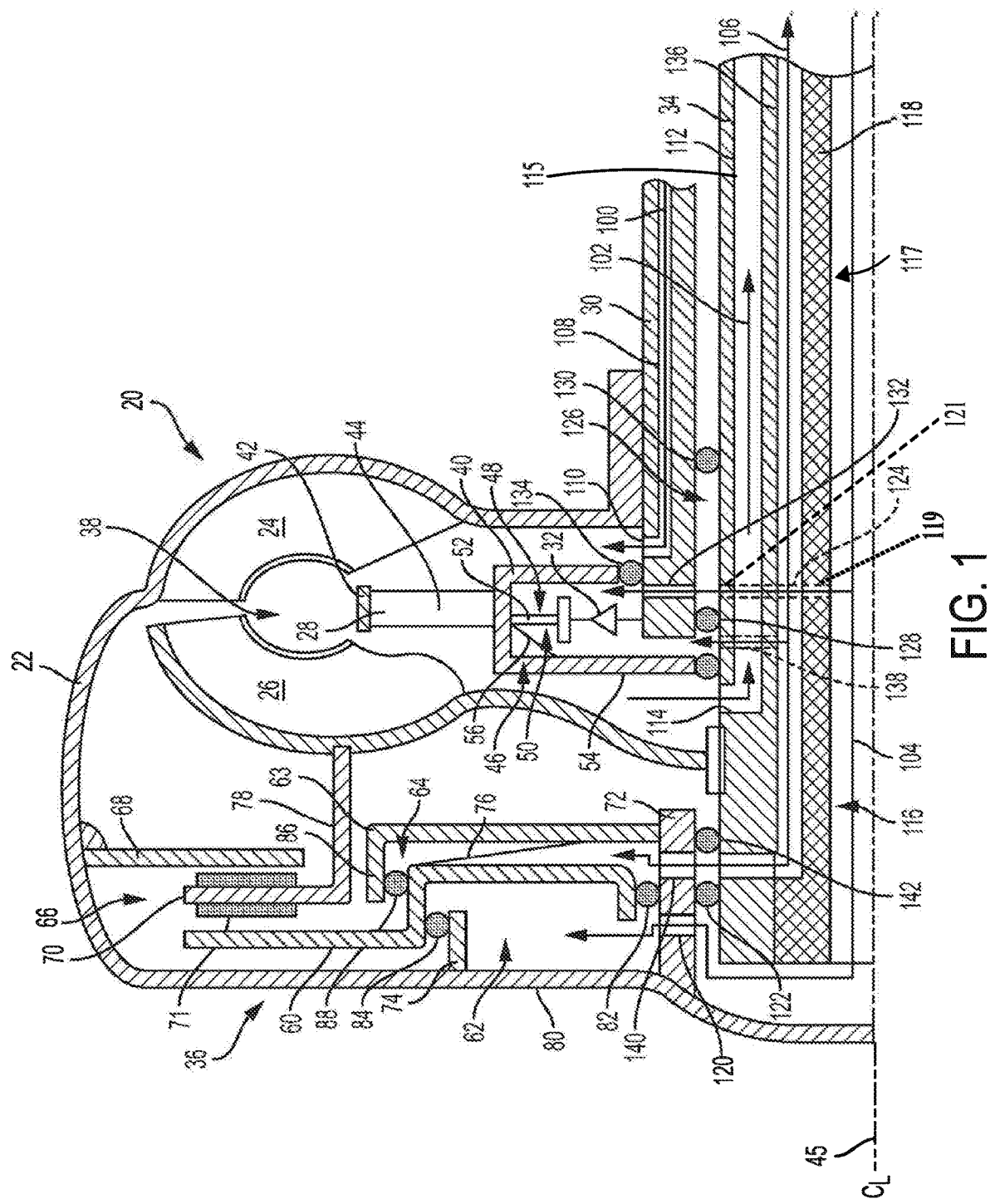
FIG. 1 is a schematic cross-sectional view of a torque converter.

Referring to FIG. 1, a vehicle includes an automatic transmission coupled to a powerplant, e.g., an engine, by a torque converter 20. The torque converter 20 includes a case 22 fixed to a crankshaft of the engine. An impeller 24 is fixed to the case 22 and rotates with the crankshaft. A turbine 26 is disposed adjacent to the impeller 24 within a hydrodynamic chamber 38 of the torque converter 20 and is connected, e.g., splined, to a turbine shaft 34 that supplies power to the transmission. A torsional damper may be interposed between turbine 26 and the turbine shaft 34 to isolate the transmission and other driveline components from engine vibrations.

A stator 28 is coupled to a stator shaft 30 by a one-way clutch 32. The stator shaft 30 is fixed to a front support of the transmission and is stationary relative to the torque converter 20. When the turbine shaft 34 is stationary or rotating slowly compared to the crankshaft, the one-way clutch 32 holds the stator 28 stationary. Rotation of the impeller 24 forces fluid to move between the impeller 24, the turbine 26, and the stator 28. The fluid exerts a hydrodynamic torque on the turbine 26. The stator 28 provides a reaction force causing the torque on the turbine 26 to be greater than the torque on the impeller 24. When the speed of the turbine 26 approaches that of the impeller 24, fluid tends to flow around the centerline of the torque converter, causing the one-way clutch 32 to overrun.

Power flow through the hydrodynamic power flow path is governed by the speed of the impeller 24 and the speed of the turbine 26. The relationship between the speeds and the torques is a function of torus geometry and blade angles of the impeller, turbine and stator. At a constant turbine speed, both the impeller torque and the turbine torque increase as impeller speed increases. A torque converter designed to exert a higher resistance torque on the impeller at a given impeller and turbine speed is called a stiffer or tighter converter, whereas a torque converter designed to exert a lower torque for the same impeller and turbine speed is called a looser converter. The tightness of a torque converter may be expressed as a K-factor that relates the impeller torque to the impeller speed. A low K-factor indicates a tight converter while a high K-factor indicates a loose converter. The ratio of the turbine torque to impeller torque generally increases as the ratio of impeller speed to turbine speed increases. The product of the speed ratio and the torque ratio is the converter efficiency, which varies between zero and one as a function of impeller speed and turbine speed.

A loose torque converter is desirable when the vehicle is stopped to reduce load on the engine improving fuel economy and reduce vibrations at idle. A loose torque converter may also be desirable for turbocharged engines as it allows the turbochargers to spool up more quickly. A loose converter may also be desirable when a driver is requesting high power to quickly increase engine speed to range capable of generating more power. Once the vehicle begins moving, a tighter torque converter may be desirable to reduce engine speeds. In typical fixed stators, a compromise K-factor is chosen to balance the competing goals of operating the engine at lower speeds where the engine is more efficient, i.e., a tighter state, and operating the engine at higher speeds where the engine produces more power, i.e., a looser state.

It may be desirable to have a torque converter in which the K-factor may be adjusted to optimize the torque converter in different operating conditions. The K-factor may be adjusted by modifying a pitch of the blades of the stator 28. Generally, the torque converter becomes looser by closing the blades of the stator, i.e., reducing fluid flow through the stator, and becomes tighter by opening the blades of the stator i.e., increasing fluid flow through the stator.

Figure 2:
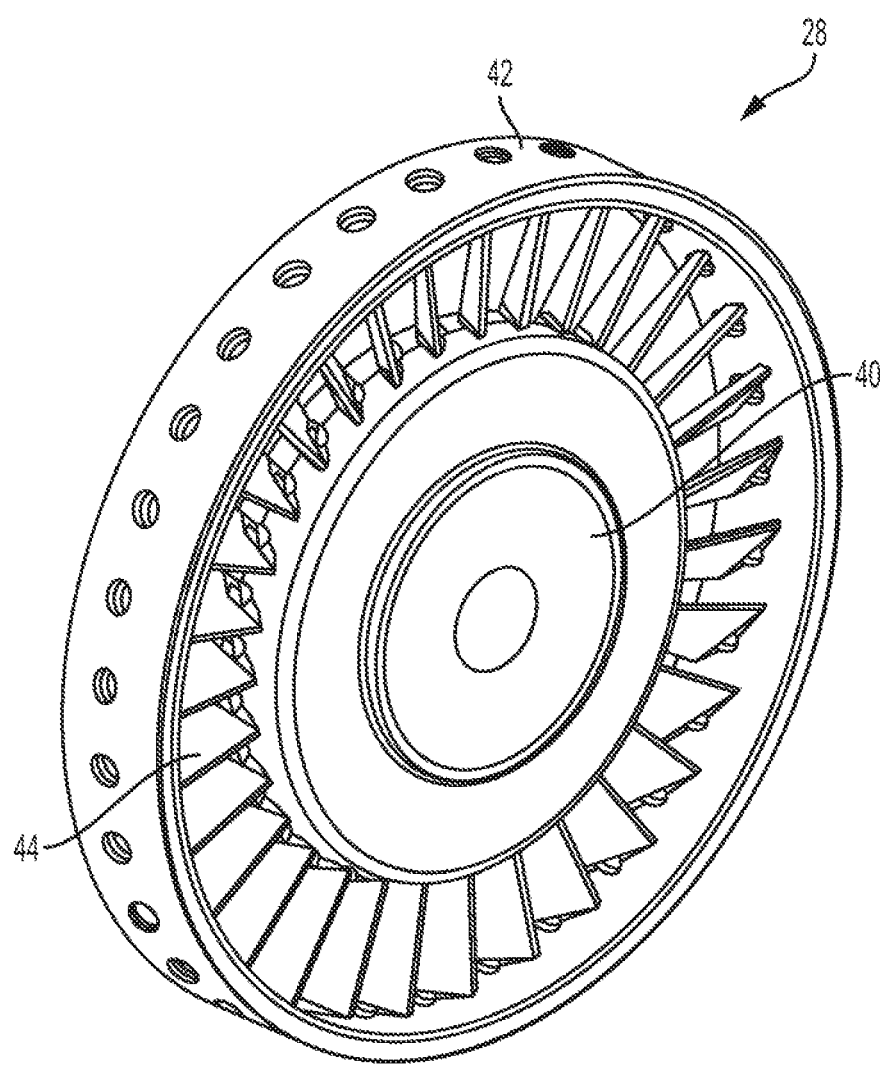
FIG. 2 is a perspective view of a stator of the torque converter.

Referring to FIGS. 1 and 2, the stator 28 may include a hub 40, an outer ring 42 encircling the hub 40, and a plurality of blades 44 circumferentially arranged between the hub 40 and the outer ring 42. Each of the blades 44 are rotatable to modify the pitch of the blades between an open position (shown), a closed position, and a range of intermediate positions. The open position corresponds to a tightest condition of the torque converter 20 and the closed position corresponds to a loosest condition. The blades may not be designed to fully open, i.e., parallel to the centerline 45, or fully close, i.e., perpendicular to the centerline 45. The blades 44 may be rotated by an actuator 46 disposed in the hub 40. The actuator 46 may include a tightening chamber 48, an isolation chamber 50, and a stator piston 52 separating the chambers 48 and 50. The stator piston 52 drives a mechanism configured to rotate the blades 44 according to movement of the stator piston 52. Many different types of mechanisms are known and will not be described here.

The blades 44 are biased to the closed position by a resilient member 56. The resilient member 56 may be disposed in the isolation chamber 50 and biases the stator piston 52 away from the front side 54 so that the blades 44 of the stator 28 are biased to the closed position. The actuator 46 is operable to rotate the blades towards the open position in response to hydraulic pressure being supplied to the chamber 48. The pressurized fluid in the tightening chamber 48 moves the stator piston 52 towards a front side 54 of the stator 28, which causes the blades 44 to rotate towards the open position. The resilient member 56 moves the stator piston 52 away from the front side 54 when the pressure in the tightening chamber 48 diminishes to rotate the blades 44 back towards the closed position.

Referring back to FIG. 1, the torque converter 20 includes a bypass clutch 36 that mechanically connects the turbine 26 to the case 22 to bypass the hydrodynamic power flow path of the torque converter 20. The bypass clutch 36 is often engaged during cruise to improve fuel efficiency. The bypass clutch 36 may include a clutch pack 66 operated by a clutch piston 60. The clutch pack 66 may include at least one plate 68 fixed to the case 22 and at least one friction disk 70 having a friction material 71 disposed thereon. The friction disk 70 is sandwiched between the clutch piston 60 and the plate 68. The clutch 36 is engaged by moving the clutch piston 60 towards the plate 68 to frictionally lock the plate 68 and the disk 70. The turbine 26 is fixed to the disk 70 by a shell 78. Thus, the turbine 26 is fixed to the impeller 24, via the case 22, when the bypass clutch 36 is fully engaged. Other bypass clutch designs may be used in the torque converter 20.

The clutch piston 60 is controlled by an apply chamber 62 and a compensation chamber 64. The apply chamber 62 is fluidly isolated from the hydrodynamic chamber 38 and is defined between a front wall 80 of the case 22, the clutch piston 60, an inner sleeve 72, and an outer sleeve 74. Two chambers may be considered to be fluidly isolated if they are capable of having meaningfully different pressures. For example, the hydrodynamic chamber 38 and the tightening chamber 48 are fluidly isolated as the tightening chamber 48 is capable of having substantially different pressures than the hydrodynamic chamber 38 due to at least the seal 134. A seal 82 is disposed between the inner sleeve 72 and the clutch piston 60, and a seal 84 is disposed between the outer sleeve 74 and the clutch piston 60 to fluidly isolate the apply chamber 62 from the hydrodynamic chamber 38. The compensation chamber 64 is also fluidly isolated from the hydrodynamic chamber 38 and is defined between an annular member 63, the clutch piston 60, the inner sleeve 72, and an axially extending portion 86 of the annular member 63. A seal 88 is disposed between the clutch piston 60 and the axially extending portion 86 to isolate the compensation chamber 64.

A resilient member 76 may be disposed in the compensation chamber 64 and biased to urge the clutch piston 60 towards the front wall 80 so that the clutch 36 is disengaged by default. The resilient member 76 may be a diaphragm spring, a wave spring, or the like. The resilient member 76 may be attached to the annular member 63.

In the illustrated embodiment, the torque converter 20 is a four-pass torque converter meaning that the torque converter is operated by four hydraulic passages 100, 102, 104, and 106. The hydraulic passages may be configured to convey fluid, e.g., transmission oil, to and from the torque converter 20 and other portions of the transmission such as the valve body and the sump. Each hydraulic passage may be comprised of a plurality of passageways defined in the transmission housing, the turbine shaft 34, the stator shaft 30, and the like, as well as orifices, and other fluid-conveying elements. The valve body includes solenoids and other components for sending fluid to the torque converter via one or more of the hydraulic passages to control operations of the torque converter 20 such as engaging the bypass clutch 36 and operating the variable-pitch stator 28.

Hydraulic passage 100 connects the valve body and the hydrodynamic chamber 38 in fluid communication. Two elements may be considered to be in fluid communication if the flow resistance between them is small enough that they have substantially the same fluid pressure. For example, the hydraulic passage 100 and the hydrodynamic chamber 38 are in fluid communication as fluid freely flows therebetween, whereas the hydrodynamic chamber 38 and the apply chamber 62 are not in fluid communication as the seals 82, 84, and 122 provide a large resistance to fluid attempting to flow between the chambers 38 and 62 enabling the chambers 38 and 62 to have different pressures.

Hydraulic passage 100 supplies fluid from the valve body to the hydrodynamic chamber 38. The hydraulic passage 100 includes a passageway 108 defined within the stator shaft 30 and an orifice 110 that allows fluid to flow from within the stator shaft 30 into the hydrodynamic chamber 38 between a back side of the case 22 and the hub 40 of the stator 28. Fluid exiting the orifice 110 flows throughout the hydrodynamic chamber 38 between the turbine 26 and the impeller 24 and also lubricates the clutch pack 66. The seals 84 and 88 prevent the fluid within the hydrodynamic chamber 38 from entering into the apply chamber 62 and the compensation chamber 64.

The hydraulic passage 102 returns fluid from the torque converter 20 to the sump of the transmission for recirculation. The hydraulic passage 102 may include a passageway 112 defined within the turbine shaft 34. An orifice 114 located near a front side of the hub 40 allows fluid to flow from the hydrodynamic chamber 38 into the passageway 112.

The hydraulic passage 104 controls the clutch 36 by supplying fluid to the apply chamber 62. The hydraulic passage 104 is in fluid communication with the valve body, which controls the fluid pressure to the apply chamber 62. The hydraulic passage 104 includes a passageway 116 defined within the turbine shaft 34 by an insert 118. The turbine shaft 34 may define a hollow center 115 that receives the insert. The insert 118 may have central bore 117 that defines at least a portion of the passageway 116 and an orifice 119. The passageway 116 may extend to the end of the shaft 34 and flows into the apply chamber 62 via an orifice 120. A seal 122 inhibits fluid within the hydraulic passage 104 from flowing to other areas of the torque converter 20.

The hydraulic passage 104 also controls the blade pitch of the stator 28. A passageway 124 extends from the passageway 116 to the tightening chamber 48. The passageway 124 may extend radially from the passage 116 through the insert 118 (via orifice 119) and through the sidewall of the turbine shaft 34 (via orifice 121) allowing fluid to flow into the space 126 between the stator shaft 30 and the turbine shaft 34. Seals 128, 130 contain the fluid within the space 126. An orifice 132 connects the tightening chamber 48 with the space 126. A seal 134 separates the hydraulic passage 104 from the hydrodynamic chamber 38.

The hydraulic passage 106 is in fluid communication with the compensation chamber 64, the isolation chamber 50, and the transmission lubrication circuit so that fluid can be conveyed to and from the torque converter 20 and the lubrication circuit. Hydraulic passage 106 may include a passageway 136 defined between the insert 118 and the sidewall of the turbine shaft 34, a passageway 138 extending radially from the passageway 136 to the isolation chamber 50, and an orifice 140 allowing the fluid to flow into the compensation chamber 64. A seal 142 isolates the hydraulic passage 106 from the hydrodynamic chamber 38.

Despite both being controlled by the hydraulic passage 104, the clutch 36 and the stator blades 44 can be semi-independently controlled due to the pressure differences required for stroking the clutch piston 60 and the stator piston 52. The pressure required to stroke the clutch piston 60 is substantially higher than the pressure required to stroke the stator piston 52 due to the resilient member 76 being substantially stiffer than the resilient member 56. Thus, the lower pressures used to actuate the blades 44 of the stator are insufficient to engage the clutch pack 66. The valve body can control the torque converter 20 by sending lower pressure signals (such as 5-20 psi) to actuate the stator 28 and higher-pressure signals (such as 40-130 psi) to actuate the bypass clutch 36. While the torque converter 20 is incapable of maintaining a loose torque converter state when the clutch 36 is being engaged, this is not problematic as conditions favoring engagement of bypass clutch 36 also favor a tight torque converter state.

Many types of torque converters, commonly called four-pass torque converters utilize four hydraulic passages (e.g., two for the hydrodynamic chamber and two for the bypass clutch) for operating the torque converter. Consequently, many transmissions are designed with four hydraulic passages to be compatible with four-pass torque converters. The torque converter 20, despite the addition of a variable-pitch stator, also utilizes four hydraulic passages, which allows the torque converter 20 to be easily retrofitted to many existing transmissions. Thus, the torque converter 20 has a significant cost and compatibility advantage over variable-pitch torque converters that use five or more hydraulic passages.

A method of operating the torque converter 20 may include circulating fluid to the hydrodynamic chamber 38 via the hydraulic passage 100 to supply the fluid to the torque converter 20. The method may further include circulating fluid from the hydrodynamic chamber 38 to the valve body of the transmission via the hydraulic passage 102. The stator 28 may be tightened by supplying fluid, at a first pressure, to the tightening chamber 48 via the passage 104 to rotate the blades 44 towards their open position. The stator 28 may be loosened by reducing the fluid pressure in passage 104 and allowing the resilient member 56 to rotate the blades towards their closed position. The bypass clutch 36 may be engaged by supplying fluid, at a second pressure, to the apply chamber 62 via passage 104. The second pressure is larger than the first pressure. The bypass clutch 36 may be disengaged by reducing the fluid pressure in passage 104.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A torque converter comprising:
a turbine disposed in a hydrodynamic chamber;
a bypass clutch including an apply chamber fluidly isolated from the hydrodynamic chamber;
a variable-pitch stator including blades controllable by an actuator that includes a a tightening chamber; and
a first hydraulic passage including a first passageway connecting between the apply chamber and a transmission and including a second passageway connecting between the first passageway and the tightening chamber.

2. The torque converter of claim 1, wherein the actuator further includes an isolation chamber that is in fluid communication with a second hydraulic passage configured to convey fluid between the isolation chamber and the transmission, wherein the actuator further includes a piston separating the tightening and isolation chambers, and the piston is biased towards the tightening chamber so that the blades are biased towards a closed position.

3. The torque converter of claim 1, wherein the first passageway includes a first radially extending orifice opening into the apply chamber and a second radially extending orifice opening into the tightening chamber.

4. The torque converter of claim 1, wherein the second passageway extends radially relative to a centerline of the torque converter.

5. The torque converter of claim 1 further comprising a turbine shaft supporting the turbine and defining an orifice, wherein at least a portion of the first passageway is radially inboard of the turbine shaft and the orifice defines a portion of the second passageway.

6. The torque converter of claim 1, wherein the bypass clutch further includes a compensation chamber, a first piston separating the apply chamber and the compensation chamber, and a first resilient member biasing the first piston towards the apply chamber, and wherein the actuator further includes an isolation chamber and a second piston separating the chamber and the isolation chamber, wherein the second piston is biased towards the chamber by a second resilient member.

7. The torque converter of claim 6, wherein the second resilient member has a lower stiffness than the first resilient member.

8. The torque converter of claim 2 further comprising:
a third hydraulic passage configured to supply fluid to the hydrodynamic chamber; and
a fourth hydraulic passage configured to return fluid from the hydrodynamic chamber.

9. The torque converter of claim 1 further comprising a stator shaft defining an orifice that forms a portion of the second passageway.

10. A torque converter comprising:
a turbine disposed in a hydrodynamic chamber;
a bypass clutch including an apply chamber fluidly isolated from the hydrodynamic chamber;
a stator shaft;
a variable-pitch stator supported on the stator shaft and including blades controllable by an actuator that has a tightening chamber; and
a first hydraulic passage extending from the apply chamber to the tightening chamber, the first passage including an axially extending portion and a radially extending portion that extends through the stator shaft, wherein the actuator is configured to tighten the blades in response to a first pressure being applied to the first hydraulic passage, and the bypass clutch is configured to be engaged in response to a second, larger pressure being applied to the first hydraulic passage.

11. The torque converter of claim 10, wherein the bypass clutch further includes a piston arranged to be stroked by the apply chamber and a first resilient member biasing the piston towards the apply chamber.

12. The torque converter of claim 11, wherein the actuator further has a second piston and a second resilient member biasing the second piston towards the tightening chamber.

13. The torque converter of claim 12, wherein the first resilient member is stiffer than the second resilient member.

14. The torque converter of claim 10, wherein the bypass clutch further includes a compensation chamber fluidly isolated from the hydrodynamic chamber and in fluid communication with a second hydraulic passage, a piston disposed between the apply chamber and the compensation chamber, and a resilient member disposed in the compensation chamber and biasing the piston towards the apply chamber.

15. The torque converter of claim 14, wherein the actuator further has an isolation chamber that is in fluid communication with the second hydraulic passage.

16. The torque converter of claim 10 further comprising a turbine shaft supporting the turbine and extending through the stator shaft, wherein the radially extending portion extends through the turbine shaft.

17. A torque converter comprising:
an impeller;
a turbine disposed in a hydrodynamic chamber;
a clutch selectively engageable to couple the impeller to the turbine and including a piston, an apply chamber fluidly isolated from the hydrodynamic chamber, a compensation chamber, and a first resilient member disposed in the compensation chamber and biasing the piston toward the apply chamber;
a variable-pitch stator including blades controllable by an actuator that includes a tightening chamber and an isolation chamber;
a first hydraulic passage including a first passageway configured to carry fluid between the apply chamber and a valve body and a second passageway connecting between the first passageway and the tightening chamber, wherein the second passageway extends radially between the tightening chamber and the first passageway, and the actuator is configured to adjust a pitch of the blades in response to a first pressure being present in the first hydraulic passage, and the piston is configured to be stroked to engage the clutch in response to a second, larger pressure being present in the first hydraulic passage; and a second hydraulic passage in fluid communication with the compensation chamber and the isolation chamber, the second passage being configured to convey fluid between the compensation chamber, the isolation chamber, and a transmission lubrication circuit.

18. The torque converter of claim 17, wherein the second passageway extends through a stator shaft.

19. The torque converter of claim 17, wherein the actuator further includes a second piston separating the tightening and isolation chambers and a second resilient member biasing the piston towards the tightening chamber, wherein the first resilient member is stiffer than the second resilient member.

20. The torque converter of claim 17 further comprising:
a stator shaft supporting the variable-pitch stator and defining a first orifice;
a turbine shaft supporting the turbine and extending through the stator shaft, the turbine shaft defining a hollow center and a second orifice; and
an insert disposed in the hollow center, wherein the insert has a central bore defining at least a portion of the first passageway and a sidewall defining a third orifice, wherein the second passageway includes the first, second, and third orifices.

\* \* \* \* \*